(12) United States Patent
Moore et al.

(10) Patent No.: US 7,043,504 B1
(45) Date of Patent: *May 9, 2006

(54) SYSTEM AND METHOD FOR PARALLEL PRIMARY AND SECONDARY BACKUP READING IN RECOVERY OF MULTIPLE SHARED DATABASE DATA SETS

(75) Inventors: David W. Moore, Morgan Hill, CA (US); Frederick Stephen Perry, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,752

(22) Filed: Apr. 10, 2000

(51) Int. Cl.
*G06F 12/00* (2006.01)

(52) U.S. Cl. .............. 707/202; 707/2; 707/4; 707/102; 707/203; 707/204

(58) Field of Classification Search ............... 707/202, 707/204, 203, 4, 102, 2
See application file for complete search history.

(56) References Cited

U.S. PATENT DOCUMENTS

| | | | |
|---|---|---|---|
| 5,043,871 A | 8/1991 | Nishigaki et al. | 707/202 |
| 5,280,611 A | 1/1994 | Mohan et al. | 707/8 |
| 5,369,757 A * | 11/1994 | Spiro et al. | |
| 5,404,508 A | 4/1995 | Konrad et al. | 707/202 |
| 5,412,801 A | 5/1995 | de Remer et al. | 714/20 |
| 5,561,795 A | 10/1996 | Sarkar | 707/202 |
| 5,561,798 A | 10/1996 | Haderle et al. | 707/202 |
| 5,721,918 A | 2/1998 | Nilsson et al. | 707/202 |
| 5,907,848 A | 5/1999 | Zaiken et al. | 707/202 |
| 6,052,692 A * | 4/2000 | Anderson et al. | 707/102 |
| 6,282,535 B1 * | 8/2001 | Pham et al. | 707/4 |
| 6,343,301 B1 * | 1/2002 | Halt et al. | 707/203 |
| 6,397,308 B1 * | 5/2002 | Ofek et al. | 711/162 |
| 6,526,417 B1 | 2/2003 | Perry | 707/202 |
| 6,542,906 B1 * | 4/2003 | Korn | 707/203 |
| 6,594,676 B1 * | 7/2003 | Moore | 707/202 |

OTHER PUBLICATIONS

TDB-ACC-NO: NN8707744, Accumulation of Data Base Changes at Randon Times Without a Data Base Outage, IBM Technical Disclosure Bulletin, Jul. 1987, US, vol. NO:30, Issue NO: 2, p. NO: 744-746.*

(Continued)

*Primary Examiner*—Shahid Alam
*Assistant Examiner*—Hung Pham
(74) *Attorney, Agent, or Firm*—Kunzler & Associates

(57) ABSTRACT

A recovery utility apparatus for expediting recovery time during failure of one or more database data sets is provided. A backup copy restore utility is configured to read and restore a backup copy of the database data set. A change accumulation manager is configured to read detail records in an incomplete change accumulation data set. A log manager is configured to read a log to derive updates subsequent to a merge end point, wherein the updates are reflective of spill records. An image copy restore utility is configured to apply the detail records to the backup copy to thereby create a restored database data set. A database update manager is configured to apply the updates to the restored database data set.

26 Claims, 5 Drawing Sheets

OTHER PUBLICATIONS

"Changes Accumulation Plus"; BMC Software Inc.; Apr. 1999; pp. 1-2.
"The IDI Toolkit"; Innovative DP Designs, Incorporated; Jul. 1999; pp. 1-2.
"Change Accumulation Plus" BMC Software, Inc. 100018023 Apr. 1999.
"The IDI Toolkit" Innovative DP Design, Inc. http://www.idionline.com/prodinfo.html.

* cited by examiner

SYSTEM AND METHOD FOR PARALLEL PRIMARY AND SECONDARY BACKUP READING IN RECOVERY OF MULTIPLE SHARED DATABASE DATA SETS

BACKGROUND OF THE INVENTION

1. Field of the Invention

The present invention relates to database recovery using back up copies and change accumulation data sets. More specifically, the invention relates to database recovery by using complete or incomplete change accumulation data sets.

2. Relevant Technology

Management of extensive databases is of paramount importance for modern day society which depends on reliable storage of data reflecting critical information. Typically, databases must be constantly operational and available to users. Modern day database systems are substantially robust that they infrequently experience a failure. Nevertheless, when a failure does occur the database recovery must be performed efficiently and accurately to minimize loss to the users. Thus, database recovery is an operation which must be performed expeditiously in order to minimize down time for users. A database experiencing an extensive period of downtime may quickly create an economic disaster.

A database is managed by a complex database management system. An example of a database management system is the Information Management System (IMS) available from IBM Corp., Armonk, N.Y. The IMS system is used to serve a vast number of databases in operation today. The IMS system[s] allows access to one or more databases in order for users to interact with the data maintained on the database. The majority of user access involves transactional operations.

As users update the database data sets in the database, the database management system records the updates into a log data set. The log data set is an amount of data, such as a file, which reflects a series of updates to the database. Log data sets are recorded in sequential records which have defined open and close points.

Users may make backup copies or series of backup copies of the database periodically to assist in the recovery of a database. These backup copies may be recorded on tape archives by tape management systems. The backup copy is used as a base to restore the database to its state prior to a database failure. In recovery, subsequent updates to the database are applied from records on the log data sets. Recovery further requires storage of attributes of the database and the backup. Database management systems often include a data set for control of recovery which comprises several attributes of the database and the backup copy. Database management systems use some form of recovery control information recorded in this data set relating to the database and the backup copy to assist in recovery.

Database management systems include a recovery facility to respond to a database failure. Upon database failure, the recovery facility creates a new database and writes the backup copy to the new database. The recovery utility further applies all the updates to the database from when the backup copy was created. Information used to restore the new database from the last state of the backup copy may be taken from the log data sets and recovery control information.

To assist in database recovery a utility, referenced herein as a change accumulation utility, accumulates updates and places them in a change accumulation data set (CADS). The CADS is an accumulation of changes in the log records that apply to the new database and are used as input during database recovery. The CADS may reflect updates for more than one database. A typical database record is updated a portion at a time and there may be overlapping updates which makes the order of recovery important. The CADS receives the overlapping updates but, after all the changes, the CADS reflects only the final changes.

In order to create the CADS, the change accumulation utility reads log data sets sequentially, that is, one after another. Typically, users organize their multiple databases into change accumulation groups so that the change accumulation utility operates as efficiently as possible. A user can run the change accumulation process against one change accumulation group and use an optional secondary output—the set of log records that were not written to the change accumulation data set—as input to the change accumulation utility for the next change accumulation group to be processed. This can be done for each change accumulation group in which the current change accumulation run uses the secondary output of the previous change accumulation run. This serial process is managed directly by the user. Users usually run change accumulation periodically so that when a database data set in a change accumulation group requires recovery, the time required to run a final change accumulation job and subsequent database recovery job is minimized. As can be expected, this sequential recovery process is quite complex.

The recovery utility reads the entire CADS into memory and applies that portion of the CADS that is relevant to the database being restored. Each record has an identification that's sequential and the database data sets are restored in a sequential order. The recovery utility addresses each record in the CADS to see if there is a change in data for that record. If so, the CADS is accessed and the relevant record merged into the new database.

During routine operation, the database management system periodically creates updates in the database and in the log data set. Over time, several updates are created. However, the updates are not permanently stored in the database until the updates are physically written on the database. In general, database activity is based on being able to "commit" updates to a database. A commit point is a point in time where updates become permanent parts of the database. The span of time between commit points is referred to as a "commit scope" or "unit of recovery" (UOR). If something goes wrong, such as a write error to the database, and the updates cannot be made, all the updates produced since the last commit point are "aborted." It is as if the updates never happened.

One method for implementing database updates and commit point processing is for the database manager to maintain the database changes in storage and not apply the changes to the databases until the commit point is reached. A copy of the database data that is changed is written to the log as the update is created. When the commit point is reached, and everything went as expected, the updates are written to the databases. If something went wrong, the storage containing the database updates is freed.

A common update to the database is a transaction which is a unitary logical piece of work that may include performing a variety of activities. At its simplest level a transaction may involve decreasing one account and increasing another account. The activities performed in the transaction may extend beyond a first commit point and will not be permanent until a subsequent commit point.

The change accumulation utility creates the CADS by taking log data sets that have been committed up to a certain commit point and combines them together. The committed log data sets are readily applied to the new database during recovery because they are permanent. Updates that occur after the last recorded commit point are not readily applied to the new database because there is no guarantee that the updates will be committed at a later commit point. Failure of a commit point results in an abort of the update and any related transactions. If the updates need to be aborted, the log record is retrieved and the copies of the unchanged database data are applied, in effect backing out the changes. Thus, updates that occur after the commit point are not necessarily committed to the database.

Each CADS comprises a detail record which is a record of committed updates from one or more logs. Each detail record is a series of contiguous bytes which can be overlaid into the backup copy of one database physical record. Applying all of the detail records in the CADS is equivalent to rerunning all of the transactions against the data base which were entered since a backup copy was made up to a "merge-end point." The merge-end point is a point in time wherein updates may no longer be merged with the new database because all change records are not available for these updates. Thus, there is no guarantee as to whether these updates have been committed. Updates which cannot be merged with the new database are written to records which are termed "spill records."

A complete CADS comprises only detail records whereas an incomplete CADS comprises detail and spill records. Creation of an incomplete CADS occurs when multiple database management systems are sharing a database. The majority of database management systems run in a shared session to maximize use of a database. During a shared session incomplete log data sets exist which have updates for periods of time in which all the log records are not available. In a sharing session with multiple database management systems it is not possible to have a complete CADS without taking the database offline and reviewing the log data sets.

Update records of incomplete log data sets cannot be resolved by the change accumulation utility because of the unavailable log records. The change accumulation utility is unable to resolve these update records and does not know if the updates may be applied or not. These update records are written to the spill records. If the relevant log records become available, the update records in the spill records may be read in a subsequent change accumulation process and may be merged with other updates. The change records are incomplete during a shared session because when the change accumulation utility runs the updates are ongoing and some of the change records will be unavailable.

At data base failure, all updates and transactions that are still pending are terminated. If updates are not committed at the time of the data base failure, the related transactions are aborted. Updates are not permanently applied to the database until the updates are committed. During recovery, the recovery utility will determine if an update ends with a commit or an abort. If the update ends with a commit, then the update is applied to the new database. If an abort, the recovery utility rescinds the update.

Recovery of a shared database is a two step process. First, the recovery utility must run a change accumulation process to read the relevant log records and read the incomplete CADS to create a complete CADS. This step is required because the recovery utility is unable to merge the data contained in an incomplete CADS with the new database.

Thus, in the art, recovery utilities are not able to directly recover from an incomplete CADS. The incomplete CADS must first be completed. In the second step, the recovery utility applies the backup copy, the complete CADS, and the log data sets and merges these components to create the new data base.

In the recovery process, completing the incomplete CADS may take a long time because it requires reading of all the log data sets that have updates. The recovery process further requires reading the completed CADS, merging their data with the log updates, and restoring from a backup copy and potentially any additional log data sets not contained in the completed CADS. The recovery process may be a very lengthy process and present devastating consequences to users who are in desperate need of a restored database. Furthermore, if a user has a series of data bases and if several of these data bases require recovery, then there may be multiple incomplete CADS which must be completed. Completion of multiple incomplete CADS requires readings of multiple log data sets. Typically each log data set is read sequentially for each incomplete CADS. Thus, a vast amount of data must be read in the recovery process which may be a relatively lengthy process.

Database recovery requires reading each backup copy and each CADS sequentially. Thus, failure of a single database will require time to read each backup copy plus the time to read each CADS and then the time to write the backup copies and merge the CADS with the restored database. This read time is in addition to the time that it takes to complete each incomplete CADS. Furthermore, if multiple databases need to be recovered and the databases have data in a single CADS, the recovery utility reads the CADS once for each database recovery. This potentially could require several reads of the same CADS.

Thus, it would be an advancement in the art to provide a simplified database recovery apparatus and method that substantially reduces recovery time after database failure. The method and apparatus should recover multiple database data sets simultaneously. It would be yet another advancement in the art to provide a database recovery process which eliminates the need to execute a change accumulation process to complete an incomplete CADS to thereby reduce recovery time. It would be a further advancement in the art to eliminate the need to sequentially read each backup copy and CADS for each CADS associated with a database requiring recovery.

Such an advancement is disclosed and claimed herein.

SUMMARY OF THE INVENTION

The present invention provides an recovery utility apparatus for expediting recovery time during failure of one or more database data sets. The invention includes a backup copy restore utility for reading and restoring a backup copy of a database data set requiring recovery. A change accumulation manager is further included in the recovery utility apparatus for reading detail records in one or more CADS. The invention further comprises a log manager for reading one or more logs associated with the failed database data set. An image copy restore utility applies the detail records and the updates to the backup copy to thereby create a restored database data set.

The backup copy restore utility reads one or more backup copies of the database data sets in parallel. Simultaneously, the change accumulation manager reads one or more CADSs in parallel. Each CADS associated with one or more database data sets requiring recovery is only read once into memory. In this manner, parallel execution of the read process reduces recovery time. To further expedite recovery, as the backup copy is written to the restored database, records from the CADS are merged with the restored database as they are needed and as they become available.

In a shared environment, each CADS will be an incomplete CADS and therefore have detail and spill records therein. The change accumulation manager reads only the detail records which have been committed and ignores the spill records. This eliminates the often time consuming process of completing each incomplete CADS for recovery.

The log manager reads one or more logs to derive the updates in the spill records. These updates are subsequent to the merge end point. Reading the logs confirm which updates in the spill records have been committed and may be merged with the restored database. The logs are read in parallel to reduce read time and are merged with the restored database before the read process is complete.

It is an object of the present invention to provide parallel execution of read processes for backup copies, CADSs, and logs.

It is another object of the invention to provide simultaneous processing and merging of data during the read processes.

It is yet another object of the present invention to require a single read of a CADS having data for more than one database data set.

It is a further object of the invention to be able to directly recover a database data set from one or more incomplete CADS without executing an additional change accumulation utility.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

Figure 1:
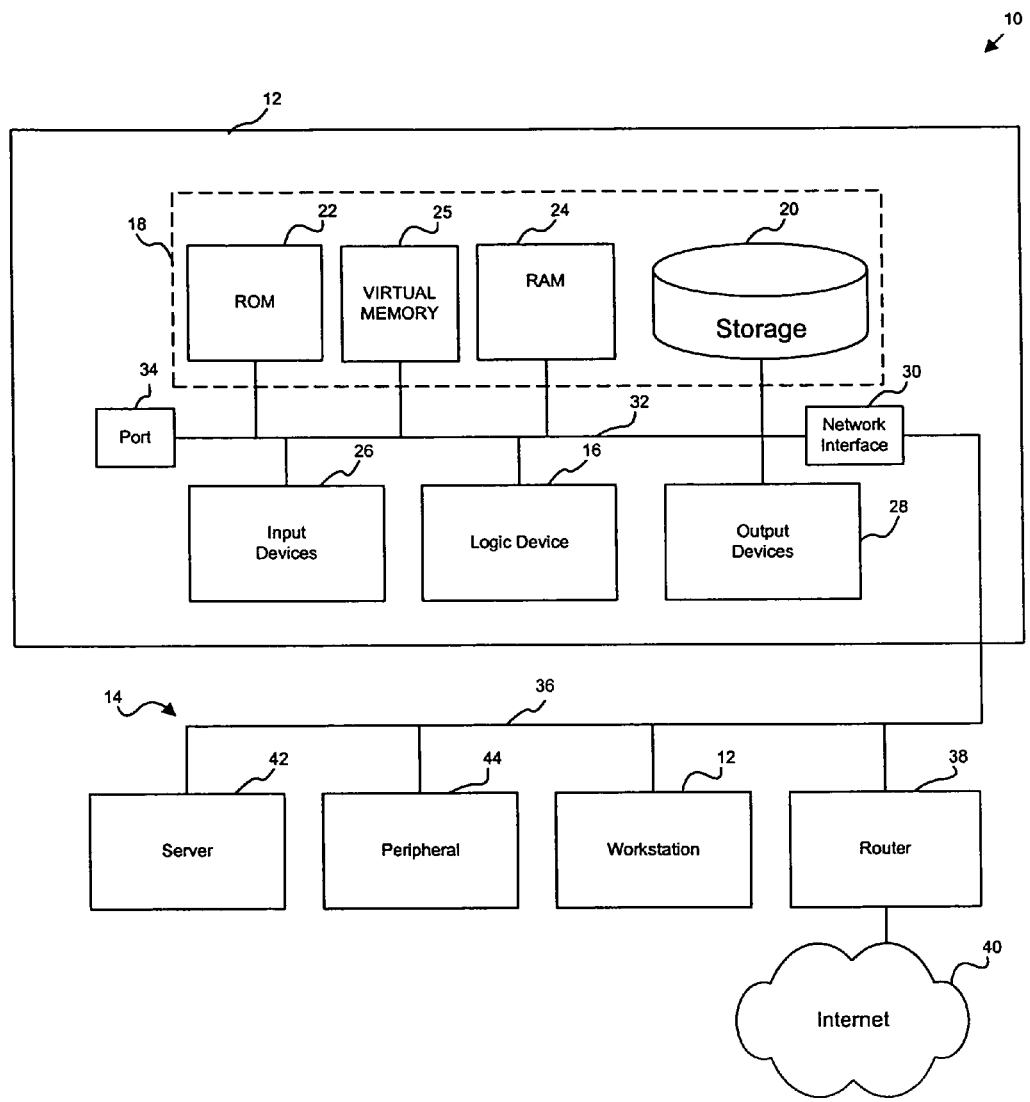
FIG. 1 is a schematic block diagram illustrating one embodiment of a computer system for implementing the format system of the present invention.

FIGS. 1 through 5 are schematic block diagrams and a flow chart diagram which illustrate in more detail certain embodiments of hardware and software modules for operation within a computer system of FIG. 1 in accordance with the present invention.

FIG. 1 is a schematic block diagram which illustrates a computer system 10 in which executables and applications, operating in accordance with the present invention, may be hosted on one or more computer stations 12 in a network 14. The network 14 may comprise a wide area network (WAN) and may also comprise an interconnected system of networks, one particular example of which is the Internet and the World Wide Web supported on the Internet.

A typical computer station 12 may include a logic device 16 and may be embodied as a central processing unit (CPU), microprocessor, a general purpose programmable device, application specific hardware, a state machine, or other processing machine. The logic device 16 may be operably connected to one or more memory devices 18. The memory devices 18 are depicted as including a non-volatile storage device 20 such as a hard disk drive, CD ROM drive, tape drive, or any other suitable storage device. The memory devices 18 further include a read-only memory (ROM) 22 and a random access volatile memory (RAM) 24. The RAM 24 may used to store executable instructions by the logic device 16 during execution. The memory devices 18 may further include a virtual memory 25 which, in one embodiment, is a portion of the non-volatile storage 20 which is used to extend the RAM 24.

The computer system 10 may also include an input device 26 for receiving inputs from a user or from another device. Similarly, an output device 28 may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Internally, a system bus 32 may operably interconnect the logic device 16, the memory devices 18, the input devices 26, the output devices 28 the network card 30, and one or more additional ports 34. The system bus 32 may be thought of as a data carrier. As such, the system bus 32 may be embodied in numerous configurations. Wire, fiber optic line, wireless electromagnetic communications by visible light, infrared, and radio frequencies may likewise be implemented as appropriate for the system bus 32.

In general, the network 14 may comprise a single local area network, a wide area network, several adjoining networks, an intranet, or a system of interconnected networks such as the Internet. The individual stations 12 on the network 14 may have varying degrees and types of communication capabilities and logic capability. Different communication protocols, e.g., ISO/OSI, IPX, TCP/IP, may be used on the network, but in the case of the Internet, a single, layered communications protocol (TCP/IP) enables communications between the differing networks 14 and stations 12.

The network 14 may include a backbone 36 for interconnecting the stations 12. The backbone 36 may be embodied in any of the numerous configurations referred to with respect to the system bus 32. A router 38 may also connect to one or more other networks, including the Internet 40.

The stations 12 communicate with each other over the backbone 36 and/or over the Internet 40. The stations 12 may comprise an application server 42, and/or peripherals 44 such as a printer, scanner, or facsimile machine. Thus, a communication link may exist, in general, between any of the stations 12.

One aspect of the invention concerns an apparatus for recovering one or more databases or database data sets in a shared or non-shared environment. In discussing the various embodiments, reference to singular or multiple elements is not intended to restrict the invention to only that configuration stated.

Figure 2:
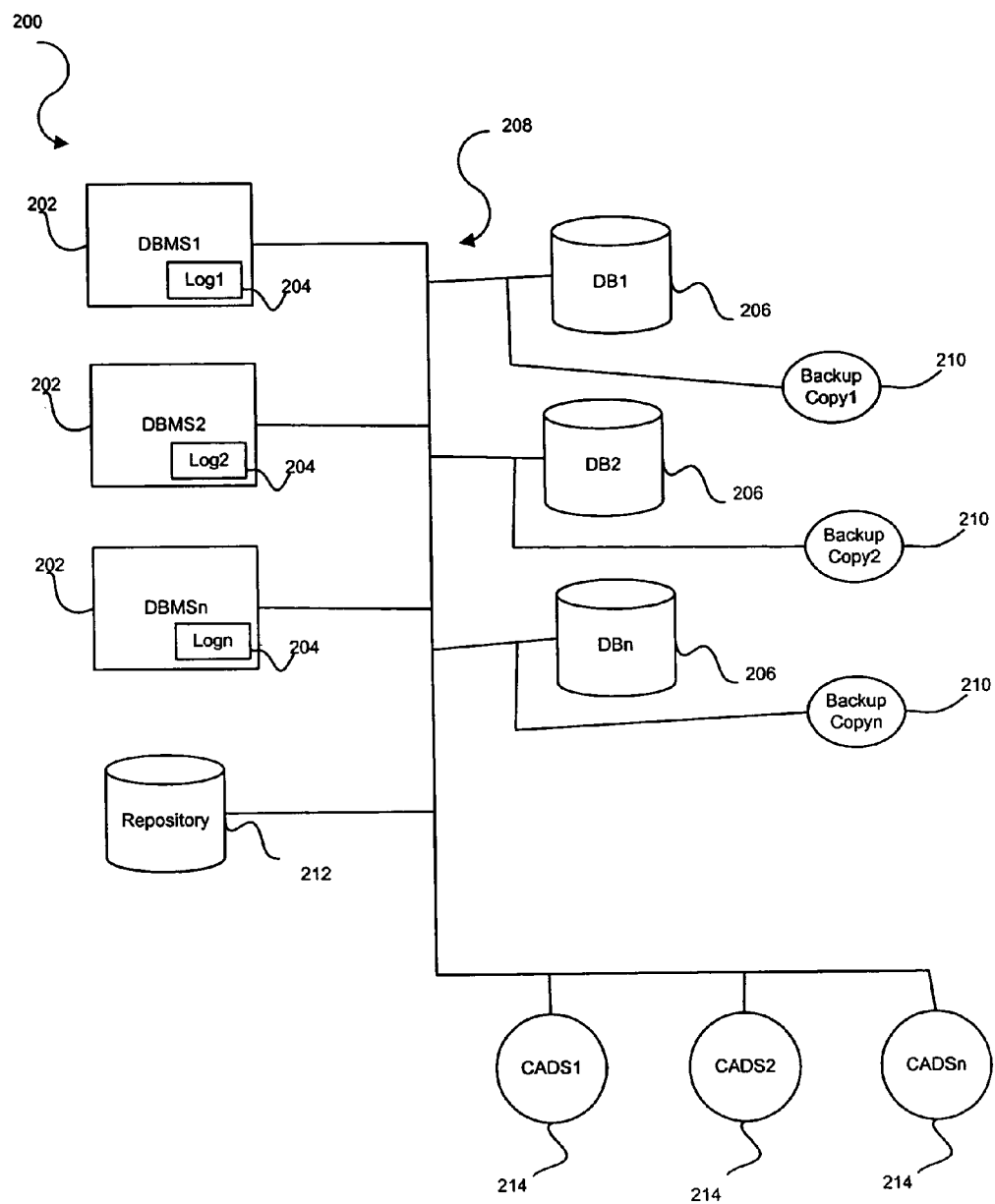
FIG. 2 is a block diagram of hardware and software components illustrating communications and interconnections between components for recovering one or more database data sets in accordance with one embodiment of the invention.

Referring to FIG. 2, a block diagram illustrates a database system 200 having various components. The database system 200 may comprise one more database management systems 202. The database management systems 202 are designated DBMS1 to DBMSn to indicate a variance of database management systems 202 in the database system 200. The database management system 202 may be incorporated on a station 12 illustrated in FIG. 1. An example of a database management system suitable for use with the invention is the IMS.

Each database management system 202 may include a log 204 having log records to track updates to data kept in memory 18 or in a database 206. The log 204 is used for reference to track data changes and other events performed by the corresponding database management system 202. Changes and other events are stored on the log 204 as log records. The log 204 may be stored on one or more memory devices 18 of the station 12.

The database system 200 further includes one or more databases 206 having one or more database data sets. The databases 206 are designated as DB1 to DBn to illustrate a variance in the number of databases 206 in a system 200. The databases 206 may be a hierarchial structured database, such as an IMS database, but may comprise a relational database in an alternative embodiment. Throughout the application, reference to databases or database data sets is used interchangeably.

Each database management system 202 may allow access to one or more databases 206 in order for users to interact with any data maintained on the databases 206. One or more database management systems 202 may also serve a single database 206. This is common practice as the size of databases 206 often require more than one database management system 202 to efficiently manage the transactions. A sharing session occurs when a plurality of database management systems 202 concurrently access a database 206.

The interconnection of the database management systems 202 and databases 206 is designated by an electrical communication 208. The electrical communication 208 may be considered a data carrier and may be embodied as the network backbone 36. Electrical communication 208 does not require that components be physically coupled to one another. The electrical communication may be achieved by electromagnetic, infrared, or other wireless communications. Furthermore, as database systems 200 vary in implementation, FIG. 2 is for illustrative purposes only as not every system 200 will have multiple database management systems 202 in communication with multiple databases 206. For purposes of the invention it is sufficient that there be one database management system 202 and one database 206 in electrical communication 208 with one another.

Database recovery methods require that a database 206 have a corresponding backup copy 210 which may be physical or logical copies. In one embodiment, the backup copy 210 is stored on a magnetic tape drive although other means of storage may also be used. The backup copy 210 reflects the contents of the database 206 up to a certain time and serves as a starting point for the database recovery process. However, the backup copy 210 is not a complete repository of data of the database 206 and other data is required to complete database recovery as explained below. The backup copy 210 may be in electrical communication 208 with other components of the system 200 as required for recovery.

The database system 200 further includes a repository 212 of recovery related information. The repository 212 is used to store information required to recover lost data if a media failure or another type of inadvertent error occurs. For example, hardware within a system may unexpectedly fail or a user may have accidentally inputted defective data or instructions that led to inconsistency in one or more databases 206. The repository 212 comprises data sets containing database recovery related information that may be specific to each database 206 used in the system 200. The repository 212 is in electrical communication 208 with other components of the system 200 as required to update and access the data sets in the repository 212. Databases 206 to be recovered may be specified in a recovery list by designating one or more database data sets, designating entire databases 206 for recovery, or designating groups as defined in the repository 212 for recovery. These groups may comprise, for example, database data set groups or other types of database groups.

The database system 200 comprises one or more CADS 214 designated CADS1 to CADSn to indicate a variance in the number of CADS 214 in the system 200. The CADS 214 contains records reflecting change data from one or more logs 204 for a certain span of time. A single CADS 214 may further reflect updates for one or more databases 206. The CADS 214 may be in electrical communication 208 with other components as required for recovery of one or more databases 206.

Figure 3:
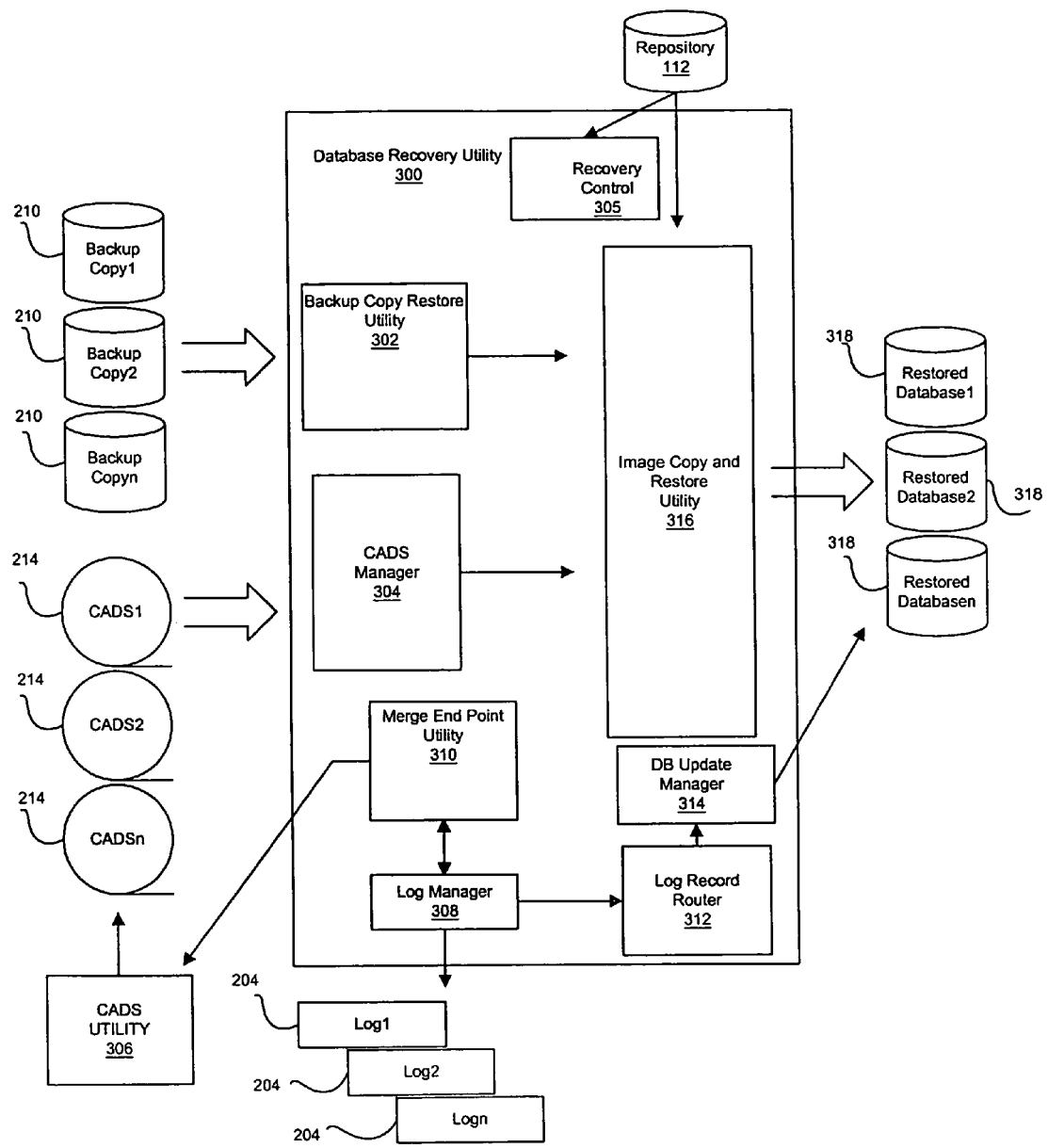
FIG. 3 is a block diagram illustrating one embodiment of a recovery apparatus for recovering one or more database data sets in accordance with one embodiment of the invention.

Referring to FIG. 3, a plurality of executable modules suitable for operation within the memory devices 18 of FIG. 1 are shown. Of course, the memory devices 18 in which the modules of the present invention are located may also be distributed across both local and remote computer stations 12. A logical configuration for effecting database recovery is referenced herein as the database recovery utility 300. The database recovery utility 300 may be incorporated on a station 12 or on the server 42 as shown in FIG. 1. Discussion of implementing the database recovery utility 300 with respect to a station 12 or server 42 is not intended as a limitation. The database recovery utility 300 may be implemented in various apparatus configurations of which the station 12 and server 42 are but examples.

The database recovery utility 300 may be integral to one or multiple databases 206 and manages the physical recovery of databases 206. The database recovery utility 300 comprises a backup copy restore utility 302 for reading and restoring one or more backup copies 210. In one embodiment, the backup copy restore utility 302 reads a backup copy 210 from a magnetic tape drive. A backup copy 210 may contain backup copy data sets for more than one database 206. Alternatively, a plurality of backup copies 210 may exist for a single database 206. In restoring multiple databases 206, there will likely be multiple backup copies 210. If more than one backup copy 210 is required, the backup copy restore utility 302 preferably reads these backup copies 210 in parallel rather than sequentially to reduce read time.

The database recovery utility 300 further comprises a CADS manager 304 to read the CADSs 214 required for recovery. As with the backup copies 210, the CADs 214 are read in parallel to reduce read time. The CADS manager 304 preferably reads the CADSs 214 in parallel as the backup copies 210 are read by the backup copy restore utility 302. The CADSs 214 are read into the memory 18 and are applied as needed to the backup copies 210 as the backup copies 210 are read and restored.

The ability to read backup copies 210 or CADS 214 in parallel may be dependent on the hardware components available. As previously stated, each backup copy 210 or CADS 214 may be stored on a storage such as a tape drive. If a tape drive is available for each backup copy 210 and CADS 214 being read, then the read time is the time to read the largest backup copy 210 or CADS 214. If fewer drives exist than the number of backup copies 210 or CADSs 214, then the read time may be substantially increased as the read time requires some sequential reading.

The database recovery utility 300 further comprises a recovery control module 305 which validates the database data sets in the repository 212 that are to be added to a recovery list. The recovery control module 305 determines the logs 204, the backup copies 210, and the CADS 214 which contain data required for recovery. This determination is based on data in the repository 212. The user must ensure that recovery is not started until all databases 206 being recovered are offline to the database management systems 202. Databases 206 in the recovery list that are allocated to active database management systems 202 will not be recovered. A message notifying the user of a database 206 which is unrecoverable may be issued by recovery utility 300.

Further illustrated in FIG. 3 is a CADS utility 306 which accumulates updates and creates the CADS 214. As previously discussed, the CADS utility 306 reads log data sets sequentially in the logs 204 to create one or more CADS 214.

The database recovery utility 300 further comprises a log manager 308 which reads the required log data sets in the logs 204. The log manager 308 generates a recovery data stream which is a set of log records required to recover a specific set of databases 206. Records in the recovery data stream are merged in creation-time sequence.

The database recovery utility 300 also includes a merge end point utility 310 which determines a merge end point in each log which is read by the log manager 308. The merge end point indicates a point in time in an incomplete log wherein log records may no longer be merged with a restored database and must be written to spill records. Thus, the merge end point marks the point in which log records transition from detail records to spill records. The determination of the merge end point is useful to the invention as will be explained below. The merge end point utility 310 may supply the merge end point to the CADS utility 306 to establish the location of the merge end point in a CADS 214.

The database recovery utility 300 may include a log record router (router) 312 for processing the log records from the recovery data stream and presenting them to a database update manager 314. The database update manager 314 updates database data sets referenced by the log records.

The database recovery utility 300 further comprises an image copy and restore utility 316 which serves to create the restored databases 318. The image copy and restore utility 316 receives the backup copy 210 from the backup copy restore utility 302 and uses the backup copy 210 as a basis for creating one or more restored databases 318. The image copy and restore utility 316 further receives data sets from the CADS manager 304. The image copy and restore utility 316 coordinates application of the data sets from the CADS 214 in an appropriate sequential order to create a restored database 318. After the image copy and restore utility has created and written to the restored databases 318, the database update manager 314 merges the log data sets into the restored databases 318 in the appropriate location.

Figure 4:
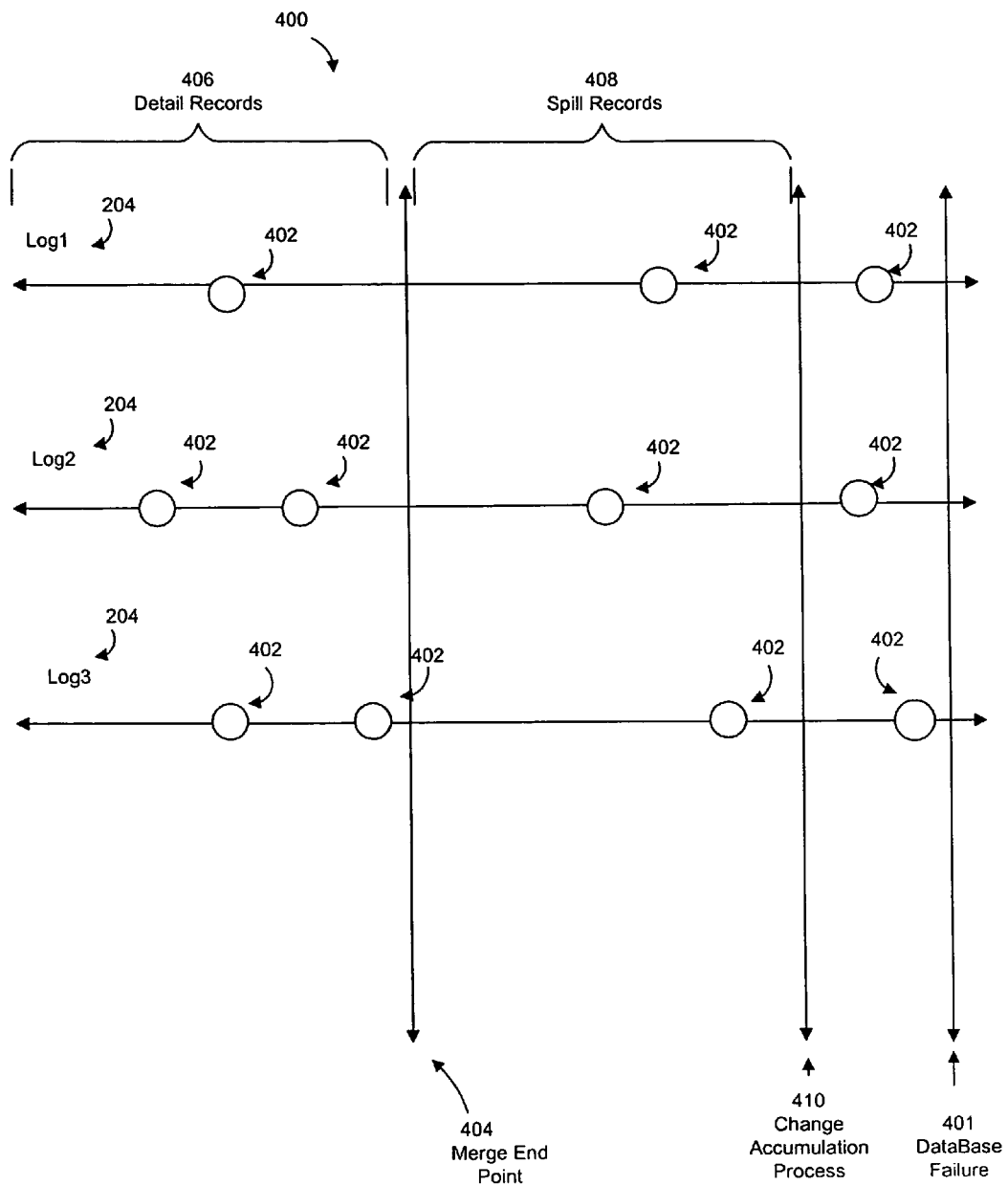
FIG. 4 is a an illustration of log time lines used for reference with the apparatus and method for recovering one or more database data sets.

Referring to FIG. 4 a time line diagram for multiple logs 204 is shown and generally designated as 400. The logs 204 illustrated in FIG. 4 are in a shared environment wherein two or more database management systems 202 are accessing a single database 206. The logs 204 span a period of time up to a database failure 401. Each log 204 contains a series of updates 402 indicated on the time line and performed by its respective database management system 202. The logs 204 do not have all log records available because of the shared environment and are therefore incomplete log data sets. Thus, it is not known if certain updates 402 have been aborted or committed.

The merge end point is designated 404 and is the point in time which separates the detail records 406 which may be merged and the spill records 408 which may not be merged. As indicated in FIG. 4, all log records on the left side of the merge end point 406 are detail records 406 and all log records on the right side are spill records 408. At the merge end point 404, the change accumulation process stops writing the log records to detail records 406 and must thereafter write the log records to spill records 408.

At a certain time, a change accumulation process 410 is executed to create a CADS 214. Updates 402 which are confirmed as being committed are written to detail records 406 in the CADS 214. However, certain updates 402 are not confirmed as being committed and may not be merged with other records. The change accumulation process 410 may be performed for the incomplete log sets but the unconfirmed updates 402 are written to spill records 408 and are part of an incomplete CADS 214. As is known in the art, spill records 408 may be read in a subsequent change accumulation process and merged with the other records provided that the relevant log records become available.

Figure 5:
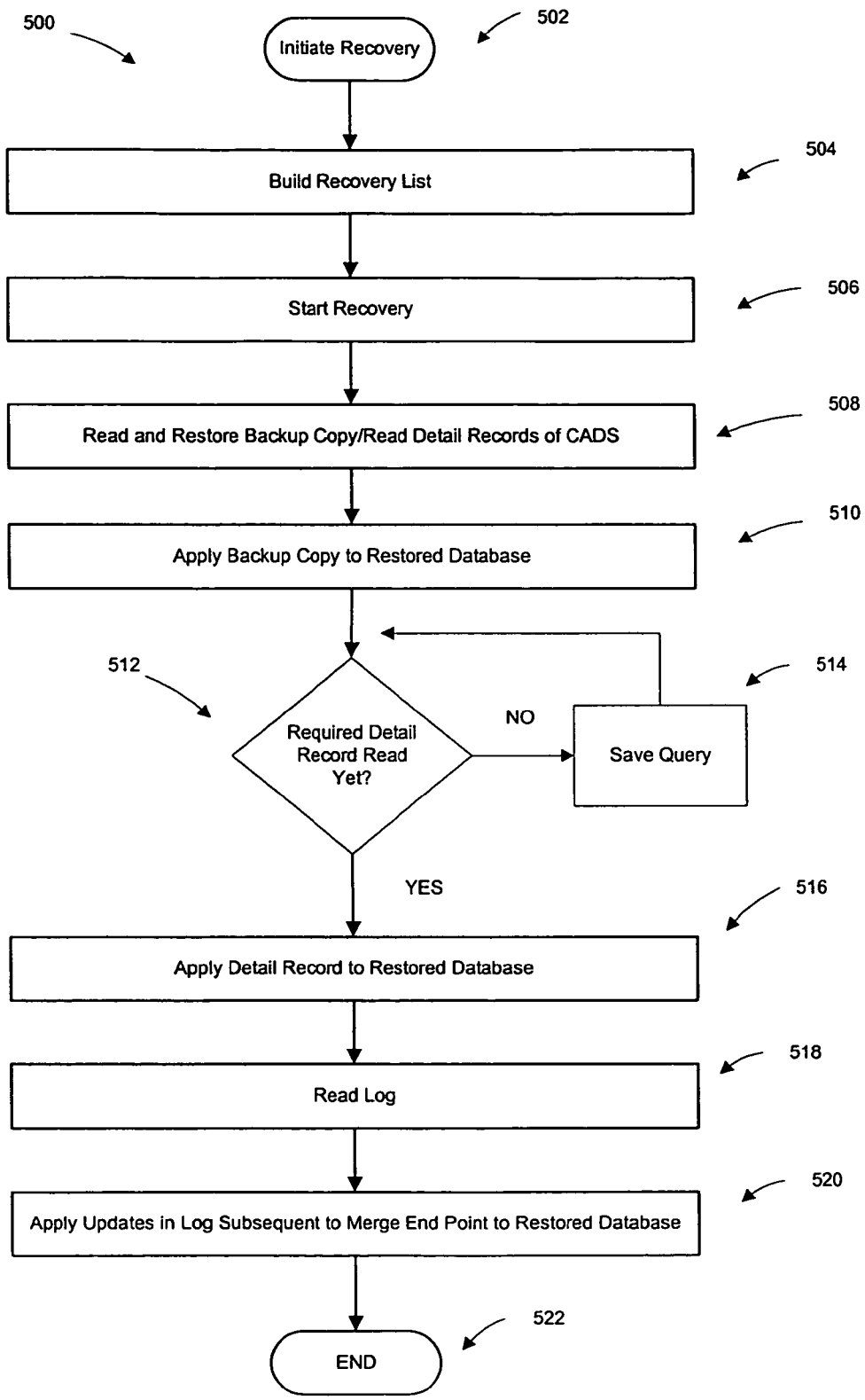
FIG. 5 is a flow diagram illustrating one embodiment of a method for recovering one or more database data sets.

Referring to FIG. 5 a sequence of method steps 500 is shown to illustrate one embodiment of method of the present invention. Prior to initiation of this method one or more databases 206 have failed. The recovery method initiates in step 502. Initiation may include preparing the database recovery utility for operation, for example, by creating a separate address space to manage backup data sets, CADSs, and log data sets, performing internal system checks, initializing memory and devices of required addresses, etc. Commands for implementing recovery may be executed by the database recovery utility 300 shown in FIG. 3. Once the initiation step 502 commences, the remaining steps of the method 500 are performed automatically without user intervention; the exception being loading of backup copies 210 and CADSs 214 into input devices 26 as explained below.

In step 504, the recovery utility 300 builds a recovery list which is a collection of databases 206 to be recovered. In one embodiment, when a recovery list is built in step 504, it is associated with a logical terminal that issued the recovery command.

Recovery continues in step 506 when the recovery utility 102 receives a command to start the recovery. The recovery utility 300 performs a check to determine if recovery is currently in process or if a desired recovery list cannot be found. If so, an error message issues and recovery is aborted. Otherwise, recovery continues. The recovery utility 300 validates the recovery list by ensuring that each database 206 is in a state that allows it to be recovered, and also determines the resources needed for recovery of these validated entries.

In step 508, the backup copy restore utility 302 reads the required backup copies 210 in parallel. The CADS manager 304 simultaneously reads the required CADSs 214 in parallel. Reading of the backup copies 210 and the CADSs 214 in parallel is dependent on the number of available input devices 26, such as tape drives. In one embodiment, the user may specify the number of input devices 26 to be used.

In recovering multiple databases 210 with records on a single CADS 214, the CADS 214 is only read once into memory 18. Records required for a restoring a specific database 210 are then retrieved from the memory 18. This eliminates the step of repeatedly reading a single CADS 214 for each database 210.

In a shared environment, the CADS 214 is incomplete and contains unmergeable spill records 408. To expedite recovery, the CADS manager 304 reads only the detail records 406 and ignores the spill records 408. Thus, recovery does not require execution of a change accumulation process to complete the CADS as only the detail records 406 are read. The detail records 404 reflect updates 402 up to the merge end point 404 and are read into memory 18.

In step 510, the backup copy 210 is written by the image copy and restore utility 316 to the corresponding restored database 318. In this manner, the backup copy 210 is used as a starting point to create the restored database 318. While writing of the backup copy 210 by the image copy and restore utility 316, the image copy and restore utility 316 determines the location of the next detail record 404 of the CADS 214 in the restored database 318. Each detail record 404 of the CADS 214 has an identification for sequential organization in the restored database 318. The image copy and restore utility 316 writes the backup copy 210 to the restored database 318 sequentially until the next detail record 404 from the CADS 214 is needed. After merging of the detail record 404 in the restored database 318, the image copy and restore utility 316 determines the location of the next detail record 404.

In step 512, the image copy and restore utility 316 queries the CADS manager 304 as to whether a specific detail record 404 required for the restored database 318 has been read yet. As detail records 406 are read by the CADS manager 304 into memory 18 the records 404 are sent to the image copy and restore utility 316 as requested. If there is a delay in the request for the detail records 406 some or all of the detail records 406 may be stored on the virtual memory 25 for longer term storage.

In step 516, if the requested detail record 404 has been read, it is sent to the image copy and restore utility 316 and merged in time sequence with the restored database 318.

In step 514, if the requested detail record 404 has not been read, the query is saved in the memory 18. When the CADS manager 304 reads the detail record 404, the query is noted and the detail records 406 are sent to the image copy and restore utility 316 to be merged into the restored database 318.

It should be appreciated that although the method 500 is illustrated in a linear fashion with respect to the flow diagram of FIG. 5, steps 508, 510, 512, 514, and 516 may be performed simultaneously. Thus, as the backup copy 210 is written to the restored database 318, the detail records 406 may be read and merged into the restored database 318.

In step 518, the merging of the backup copy 210 and the CADS 214 into the restored database 318 is completed. The log manager 308 reads one or more logs 204 into memory 18 and the merge end point utility 310 determines the location of the merge end point 404 in the logs 204. In a shared environment, there will likely be more than one log 204 to read. The logs 204 are read in parallel to reduce the read time. Once again, parallel reading of the logs 204 may be dependent on the number of input devices 26 available. Thus, the log read time may be as long as is required to read the longest log 204.

The log manager 308 derives updates 402 subsequent to the merge end point 404 and these updates 402 are reflected in the spill records 408. The log manager 308 is able to determine which updates 402 in the spill records 408 have been committed based on the reading of the logs 204. The updates 402 are sent in a recovery data stream to the router 312 and then to the database update manager 314.

In step 520, the database update manager 314 is driven by the log record router 312 to merges the updates 402 into the restored database 318 in time sequence. The database recovery utility 300 only enables operation of the database update manager 314 after the image copy and restore utility 316 has completed its writing to the restored databases 318. Each committed update subsequent to the merge end point 404 is accounted for and merged into the restored database 318. Updates 402 from the spill record 408 may be merged into the restored database 318 simultaneously with the reading of the logs 204 to further expedite the recovery process. Thus, as updates 402 are confirmed as committed they are immediately merged with the restored database 318 as subsequent updates 402 are read from the logs 204. Thus, the restored database 318 is an accurate reflection of the database 206 just prior to the failure.

In step 522, the method 500 terminates.

A primary advantage of the present invention is that several processes are performed in parallel. Backup copies 210 and CADSs 214 are read in parallel into the memory for simultaneous processing. The detail records 406 may therefore be immediately available simultaneously with the writing of the backup copy 210 to the restored database 318. In the event that detail records 406 are not immediately required, they may be moved into longer term storage. Furthermore, each CADS 214 required for database recovery is read into memory once no matter how many databases 206 have records in the CADS 214. Logs 204 are also read in parallel rather than sequentially to reduce the amount of log read time. Thus, the elapsed time for recovery of one or more databases is:

the read time for the largest CADS 214 or the largest backup copy 210;
plus the time to write to the largest restored database 318;
minus the overlap time of reading the CADSs 214 and backup copies 210 while simultaneously writing to the largest restored database 318;
plus the read time for the largest log 204;
plus the time to merge the updates 402 from the log 204 to the restored databases 318; and minus the overlap time of reading the logs 204 and merging the updates 402.

Another primary advantage of the invention is that database recovery is performed directly from incomplete CADSs 214. By ignoring the spill records in the CADS 214 and relying on subsequent reads of the logs 204, all committed updates 402 are merged into the restored database 318. This eliminates the time consuming requirement of executing a change accumulation process to complete each incomplete CADS 214. Thus, restoration of a database 206 in a shared environment may be substantially expedited.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for recovering a failed database data set, the apparatus comprising:
   a memory device storing executable modules, the modules comprising:
      a recovery utility having,
         a backup copy restore utility configured to read and restore a backup copy of the failed database data set;
         a merge end point utility configured to determine a merge endpoint reflective of a separation of detail and spill records in a log;
         a change accumulation manager configured to read a change accumulation data set to derive detail records in parallel with the read and restore of the backup copy;
         an image copy restore utility configured to apply the derived detail records to the backup copy during the read and restore of the backup copy to thereby create a restored database data set;
         a log manager configured to read the log to derive updates subsequent to the merge end point; and
         a database update manager configured to apply the derived updates to the restored database data set.

2. The apparatus of claim 1 wherein the backup copy restore utility is further configured to read and restore a plurality of backup copies in parallel.

3. The apparatus of claim 1 wherein the change accumulation manager is further configured to read in parallel a plurality of change accumulation data sets to derive detail records.

4. The apparatus of claim 1, wherein the log manager is further configured to read a plurality of logs in parallel to derive updates subsequent to the merge end point.

5. The apparatus of claim 1, wherein the database update manager is further configured to apply the updates after the backup copy is restored.

6. The apparatus of claim 1 further comprising a virtual memory and wherein the change accumulation manager is further configured to store at least a portion of the detail records in the virtual memory.

7. The apparatus of claim 1 wherein the backup copy restore utility is configured to send a query to the change accumulation manager for a detail record associated with the database data set during the read and restore of the backup copy.

8. The apparatus of claim 7 wherein the change accumulation manager is configured to save the query if the detail record has not yet been read by the change accumulation manager and further configured to send the detail record to the image copy restore process if the detail record has been read by the change accumulation manager.

9. A method for recovering a failed database data set, the method comprising:
   providing an image copy restore utility;
   providing a log manger;
   reading and restoring a backup copy of the failed database data set;
   reading a change accumulation data set to derive detail records associated with the failed database data set in parallel with the reading and restoring of the backup copy;
   the image copy restored utility applying the derived detail records to the backup copy during the reading and restoring of the backup copy to thereby create a restored database data set;
   determining a merge endpoint within a log;
   the log manager reading the log to derive updates subsequent to the merge endpoint; and
   applying the derived updates to the restored database data set.

10. The method of claim 9 further comprising reading and restoring a plurality of backup copies in parallel, wherein the backup copies are associated with corresponding failed database data sets.

11. The method of claim 9 further comprising reading a plurality of change accumulation data sets in parallel to derive detail records.

12. The method of claim 9 wherein reading the log and applying the updates are executed after restoring the backup copy.

13. The method of claim 9 further comprising reading a plurality of logs in parallel to derive updates subsequent to the merge end point and applying the updates to the restored database data set.

14. The method of claim 9, wherein the merge endpoint is reflective of a separation of detail and spill records in the log.

15. The method of claim 9 further comprising storing at least a portion of the detail records in a virtual memory.

16. The method of claim 9 furthering comprising generating a query to prompt for a detail record associated with the database data set.

17. The method of claim 16 further comprising saving the query if the detail record has not yet been read and responding to the query by applying the detail record to the backup copy if the detail record has been read.

18. A computer readable medium having stored thereon computer executable instructions for performing a method for recovering a failed database data set, the method comprising:
   providing an image copy restore utility;
   providing a log manger;
   reading and restoring a backup copy of the failed database data set;
   reading a change accumulation data set to derive detail records associated with the failed database data set in parallel with the reading and restoring of the backup copy;
   the image copy restored utility applying the derived detail records to the backup copy during the reading and restoring of the backup copy to thereby create a restored database data set;

determining a merge endpoint within a log;
the log manager reading the log to derive updates subsequent to the merge endpoint; and
applying the derived updates to the restored database data set.

19. The computer readable medium of claim 18 wherein the method further comprises reading and restoring a plurality of backup copies in parallel, wherein the backup copies are associated with corresponding failed database data sets.

20. The computer readable medium of claim 18 wherein the method further comprises reading a plurality of change accumulation data sets in parallel to derive detail records.

21. The computer readable medium of claim 18 wherein reading the log and applying the updates are executed after restoring the backup copy.

22. The computer readable medium of claim 18 wherein the method further comprises reading a plurality of logs in parallel to derive updates subsequent to the merge end point and applying the updates to the restored database data set.

23. The computer readable medium of claim 18, wherein the merge endpoint is reflective of a separation of detail and spill records in the log.

24. The computer readable medium of claim 18 wherein the method further comprises storing at least a portion of the detail records in a virtual memory.

25. The computer readable medium of claim 18 wherein the method further comprises generating a query to prompt for a detail record associated with the database data set.

26. The computer readable medium of claim 25 wherein the method further comprises saving the query if the detail record has not yet been read and responding to the query by applying the detail record to the backup copy if the detail record has been read.

* * * * *